(12) United States Patent
Canessa

(10) Patent No.: US 9,039,532 B2
(45) Date of Patent: May 26, 2015

(54) INTERACTIVE VIDEO GAME WITH TOYS HAVING FUNCTIONALITY THAT IS UNLOCKED THROUGH GAME PLAY

(71) Applicant: Greg Canessa, Santa Monica, CA (US)

(72) Inventor: Greg Canessa, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 36 days.

(21) Appl. No.: 13/665,825

(22) Filed: Oct. 31, 2012

(65) Prior Publication Data

US 2014/0121008 A1 May 1, 2014

(51) Int. Cl.
*A63F 9/24* (2006.01)
*A63F 13/00* (2014.01)
*A63F 13/98* (2014.01)
*A63F 13/69* (2014.01)
*A63F 13/95* (2014.01)

(52) U.S. Cl.
CPC .................. *A63F 13/02* (2013.01); *A63F 13/69* (2014.09); *A63F 13/98* (2014.09); *A63F 13/95* (2014.09)

(58) Field of Classification Search
CPC ................ A63F 2009/2401; A63F 2009/2442; A63F 2009/2447; A63F 2009/2454
USPC ............................................................ 463/39
See application file for complete search history.

(56) References Cited

U.S. PATENT DOCUMENTS

| | | | |
|---|---|---|---|
| 4,846,693 A | 7/1989 | Baer | |
| 5,636,994 A | 6/1997 | Tong | |
| 5,746,602 A | 5/1998 | Kikinis | |
| 6,560,511 B1 | 5/2003 | Yokoo et al. | |
| 7,081,033 B1 | 7/2006 | Mawle et al. | |
| 2005/0193015 A1* | 9/2005 | Logston et al. | 707/104.1 |
| 2007/0015588 A1 | 1/2007 | Matsumoto et al. | |
| 2008/0153594 A1* | 6/2008 | Zheng | 463/39 |
| 2011/0294579 A1 | 12/2011 | Marks et al. | |
| 2013/0130587 A1* | 5/2013 | Cohen et al. | 446/175 |

* cited by examiner

*Primary Examiner* — Milap Shah
*Assistant Examiner* — Jason Pinheiro
(74) *Attorney, Agent, or Firm* — Klein, O'Neill & Singh, LLP

(57) ABSTRACT

A videogame system for use in connection with a toy, where each of the toys includes an identification device such as an RFID tag. Each of the toys is also associated with a corresponding game character or object. The toys further comprise audio, visual and other effects, wherein at least some of said effects are initially disabled, but later enabled as the user reaches certain achievements with the videogame.

6 Claims, 10 Drawing Sheets

INTERACTIVE VIDEO GAME WITH TOYS HAVING FUNCTIONALITY THAT IS UNLOCKED THROUGH GAME PLAY

BACKGROUND OF THE INVENTION

The present invention relates generally to video games and, more particularly, to a video game and a toy used in connection with the video game, where the toy has functionality responsive to events or achievements in the video game.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being a fantasy.

Video games, being generally provided by way of an electronic device and associated display, often lack a physical component by which a player may touch and hold a representative object associated with video game play or otherwise have a physical object representative of video game play. Despite the sometimes intense graphics action of various video games, the game play experience remains two dimensional. Merely interacting with a displayed simulated environment may not allow game players to fully relate to game play, with a sharply distinct separation between a game play world and the world physically inhabited by the game players.

BRIEF SUMMARY OF THE INVENTION

One aspect of the invention provides a video game system comprising a console, such as a game console, computer, mobile device or server, and a toy comprising an electronic payload, wherein the toy is in communication with the gaming console. The toy may in some embodiments communicate directly with a gaming platform without the need for a peripheral. For example, the toy may communicate with a gaming platform via a wired connection or known wireless communication techniques, such as near field communication (NFC), RFID, WiFi, or Bluetooth. In some embodiments the toy may communicate with the gaming device by way of a peripheral communicatively coupled to the gaming device. In various embodiments the electronic payload may include one, some, or all of, without limitation, a light source, sound effect device, motor, actuator, heat source or other device to create a visual, audio, motion, physical, thermodynamic or other effect on the toy. In some embodiments these payloads may be enabled or activated in response to events or achievements and, in some embodiments, may persist with the toy for a period of time after the toy is no longer in communication with the console.

Another aspect of the present invention provides a video game and a toy used in connection with the video game, where the toy has functionality, such as visual effects, audio effects, movements, or digital data, and wherein at least part of that functionality is disabled initially and later enabled as the user progresses through the video game.

Another aspect of the invention provides a video game system comprising a gaming device, such as a game console, computer, mobile device or server, and a toy comprising an electronic payload that may communicate with the gaming device directly or via a peripheral to the gaming device. The peripheral may also provide power to the toy for the electronic payload, or power may be provided to the electronic payload through an independent source, such as a battery or other power source connected to the toy or external to the toy. In various embodiments the electronic payload may include, without limitation, a light source, a display device, sound effect device, motor, actuator, heat source or other device to create a visual, audio, motion, physical, thermodynamic or other effect on the toy. The electronic payload may be activated or triggered an a variety of game related events, such as completing a level in the game, defeating an enemy in the game, beating other competitors in a multi-player environment, collecting a certain amount of points or virtual money, using the toy on multiple platform or any other game-related events, achievements or tasks.

In another aspect of the invention, the toy comprises an electronic payload for providing effects or functionality (e.g. light, audio, movement, radio control or other effects or functionality well known in the toy arts) when the toy is being used separate from a video game environment. Some of those effects or functionality may be set initially to disabled or dormant. As the user plays with the toy in connection a video game and reaches certain achievements within the game in connection with the toy, the previously disabled effect or functionality may become enabled or unlocked such that the user can enjoy those features when playing with the toy separate from the video game system. Those features may be unlocked permanently or for a limited time duration (or a combination thereof depending on the feature) in order to reward and encourage continues game play.

In another aspect of the invention, the real-world toy effects are also reflected in the virtual representation of the toy in the game. The achievements that triggered the activation of the effects may be stored on a memory connected to the toy, the memory of a gaming device or on a server in communication with the toy and/or gaming device, allowing the achievement and a virtual representation of that achievement to be reflected across multiple gaming devices or platforms.

In one aspect, the invention provides a toy for use with a video game, comprising: a receiver for receiving signals; an electrically actuated payload configured to provide perceptible effects; memory for storing an indication of enablement status of the electrically actuated payload; control circuitry for setting the memory based on at least signals received by the receiver, and for commanding actuation of the payload, with actuation of the payload dependent on the indication of enablement status stored by the memory.

In another aspect, the invention provides a toy comprising: a transceiver configured and adapted to provide communication between with a gaming device providing a video game having predetermined achievement levels; an electronic payload configured to provide effects; control circuitry for controlling said electronic payload to enable or disable said effects, wherein said control circuitry directs said electronic payload to enable or disable said effects responsive to completion of said predetermined achievement levels.

In another aspect, the invention provides a system, comprising: a gaming device for providing a videogame having predetermined achievement levels; a toy configured to communicate with said gaming device, said toy including circuitry for providing effects and further including control circuitry for enabling and disabling said effects, wherein said effects are only enabled when said gaming platform communicates to said control circuitry that said predetermined achievement levels within said videogame were reached.

These and other aspects of the invention are more fully comprehended upon review of this disclosure.

DETAILED DESCRIPTION

Figure 1A:
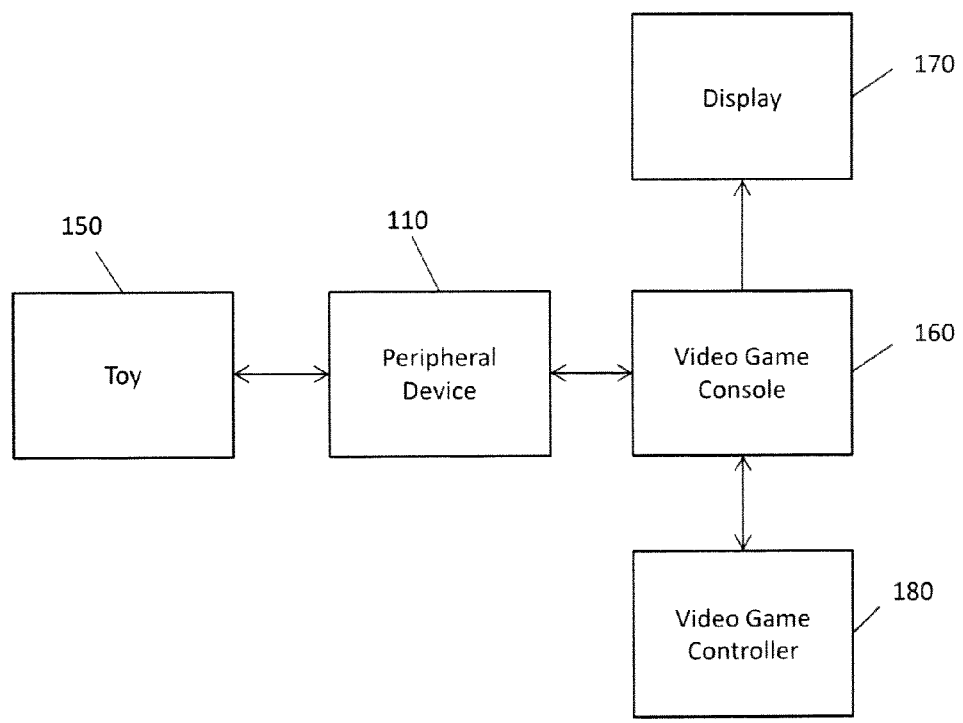
FIG. 1A is a block diagram illustrating an example of a video game system in accordance with aspects of the present invention.

FIG. 1A is a block diagram illustrating an example of a video game system in accordance with aspects of the present invention. Referring to FIG. 1, the video game system includes a video game console 160 with a processor for executing program instructions providing for game play and associated circuitry, a video game controller 180, a display device 170, a peripheral device 110 and a toy 150. The toy includes communication circuitry to allow for communication with the video game console, for example to receive commands from the video game console, either directly or by way of the peripheral device. The toy also includes an electronic or electrical payload, and circuitry for activating the payload and in some embodiments the toy includes circuitry for enabling or disabling activation of the payload. For example, in some embodiments the toy may receive a command to activate the payload, but the payload will not be activated absent a prior or concurrent command to enable the payload. The game console may provide a command to enable the payload based on video game play, for example attaining of an achievement or an achievement level by a game character associated with the toy.

In some embodiments activation of the payload, or an effect of activation of the payload, is irreversible. In some embodiments enablement of activation of the payload is irreversible, with activation of the payload occurring whenever the toy has sufficient power to activate the payload. In some embodiments the toy includes circuitry to allow enablement of activation of the payload, with in some embodiments the enablement of activation being irreversible. In some embodiments the circuitry sets a memory element of the toy to indicate enablement of activation of the payload, and the payload is not activatable unless the memory element is so set. In some embodiments the payload is for example one or more light emitting diodes, which serve as a light source which may be used to produce visual effects in connection with a video game. Other electronic or electrical components may comprise the payload, as is for example discussed in this disclosure. In an alternative embodiment, video game console 160 is also in communication with a remote server.

Although a video game console 160 is depicted as a gaming device, it is understood that in other embodiments the video game may be operated on a personal computer, a mobile device (e.g. a portable gaming device, a cell phone, a portable computer, or a tablet computer) or on a remote server or any other gaming platform alone or in combination with other devices in a system.

As illustrated in FIG. 1A, the toy communicates with the game console by way of a peripheral device 110. In alternative embodiments, the peripheral device is not needed. For example, in certain embodiments, toy 150 may communicate directly with the video game console 160. In still other embodiments, the video game controller 180 or display 170 may facilitate communication between the toy 150 and the video game console 160.

Figure 1B:
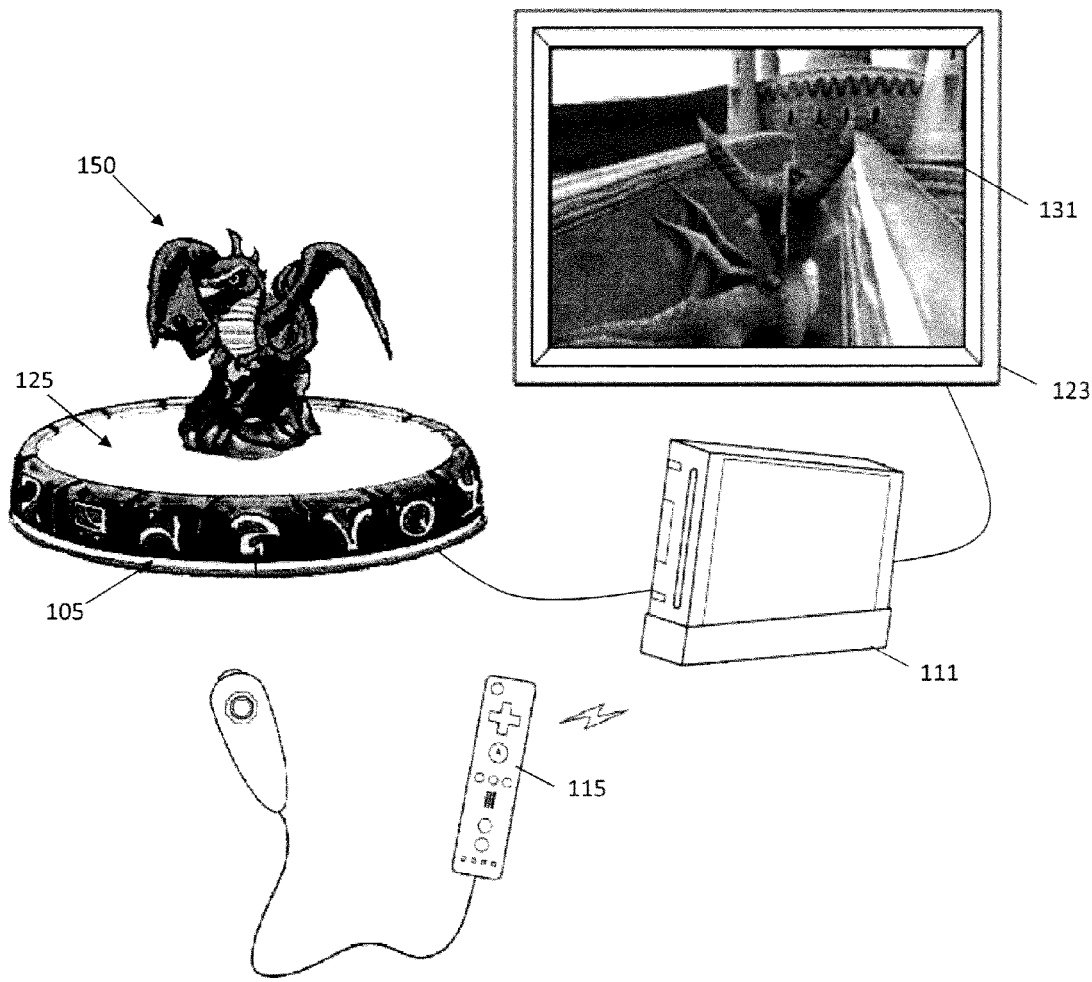
FIG. 1B illustrates an example of a video game system in accordance with aspects of the invention.

FIG. 1B illustrates an example of a video game system in accordance with aspects of the invention. The video game system includes a game console 111 with a processor for executing program instructions providing for game play and associated circuitry, user input devices such as a game controller 115, a display device 123 for displaying game action, a peripheral device 105, and a toy 150, which in various embodiments includes the capability to provide audio, visual or other physical effects. The peripheral device 105 may also provide the toy 150 with electrical power to provide such effects.

The peripheral device 105 may also provide the capability to read and write information to the toy 150. The processor, responsive to inputs from the user input devices and the peripheral device, generally commands display on the display device of game characters in and interacting with a virtual world of game play and possibly each other. In addition, the processor, responsive to inputs from the peripheral device, may be used to add characters and objects to the virtual world, with the characters able to manipulate the added objects and move about the virtual world. For example, the processor may include characters in game play based on inputs from the peripheral device, and the processor may control actions and activities of game characters based on inputs from the user input devices.

The toy 150 may produce, by way of an electrical or electronic payload of the toy, various perceptible effects, such as emitting light, generating sounds, producing movement by the toy, generating heat or other physical effects. In some embodiments, the toy may produce such effects in response to proximity of the toy to peripheral 105. The toy 150 may also produce such effects either while being used in connection with the gaming system or, in various embodiments, independently of the gaming system.

Further, the processor may initiate, command or control the toy 150 to produce various effects, such as emitting light, generating sounds, producing movement by the toy, generating heat or other physical effects in accordance with game play, characteristics of a video game character, video game achievements or the entry or exit into or out of game play of a character associated with the toy. Still further, the processor may communicate with control circuitry on the toy 150 to enable or disable certain effects or functionality of the toy. The functionality on the toy 150 may be enabled permanently or temporarily, in various embodiments.

The instructions providing for game play are generally stored on removable media, for example, an optical disk. Accordingly, the game console may include an optical drive, for example, a DVD-ROM drive, for reading the instructions for game play. In some embodiments, the game console may be a personal computer, including similar internal circuitry as herein described, as well as, for example, a built-in display and built-in user input devices, such as a keyboard and a touch pad. In other embodiments, the instructions providing for game play may be stored in a remote server that are accessed by a computer or mobile device. In yet other embodiments, the instructions providing for game play may be stored locally on the gaming device memory.

The display device is generally coupled to the gaming platform by a cable, although in some embodiments a wireless connection may be used. In many embodiments, the display device is a liquid crystal display. In some embodiments, the display device is a television. In some embodiments, the display device is a cathode ray display, a plasma display, an electroluminescent display, an LED or OLED display, or other display. A display screen 131 of the display device displays video images of game play, generally as commanded by the processor or other associated circuitry of the gaming platform. In the embodiment of FIG. 1B, the display screen shows a screen shot of video game play. As illustrated, the screen shot shows a display of a character, generally controlled by and animated in accordance with user inputs, approaching an inanimate item in the form of what may be considered a castle.

The peripheral device, in some embodiments and as shown in FIG. 1B, has a substantially flat upper surface 125 for placement of toys thereon. The peripheral device includes wired or wireless communication circuitry for communicating with circuitry of the toy, and wired or wireless communication circuitry for communicating with the game console. The game player generally places game toys, for example, object 150 in the form and representative of a dragon as shown in FIG. 1B, on the flat surface of the peripheral device during game play, and the peripheral device communicates information of the toy to the game console and commands from the game console to they toy. Of course the toy object shown in FIG. 1B is exemplary and the toy object could also be in the form of an action figure, a fantasy figure, a vehicle, or other toy object. The toy object is generally in the form of and representative of a game item such as a game character or other game item. In several embodiments, the toy is associated with a game character during game play.

Figure 2:
FIG. 2 is a model of a toy in accordance with embodiments of the invention.

FIG. 2 illustrates a toy in accordance with embodiments of the invention. As shown in FIG. 1, the toy includes a base 163 and a toy figure 161 atop the base. Of course, in various embodiments the toy could be configured without the base.

As shown in FIG. 2, the toy includes various surfaces. In certain embodiments implementing a lighting effect, various surfaces of the toy may be comprised of a fluorescing or translucent material to allow for lighting effects when provided with light from a light source. For example, the eyes of the toy may be made of a fluorescing or translucent material, to allow for light to emit from an eye of the toy figure in response to proximity with the peripheral or based on game play using the toy. The light source may be, in various embodiments, a light bulb, a light emitting diode (LED) or other solid state light source, fiber-optics receiving light from a light source, an electroluminescent wire or sheet, a phosphor doped or covered material, an incandescent light source, a fluorescent light source, a laser, or other light source, for example. In some embodiments, the light source is a red, green and/or blue LEDs. The light source in some embodiments is within the toy figure, in some embodiments within the base, and in some embodiments on or extending from a surface of the toy.

Each toy may include machine-readable information, for example, memory, a radio frequency identification (RFID) tag or a barcode. The machine-readable information may be sensed, read, and/or in some embodiments written by the peripheral device and/or the gaming device, directly or indirectly. The machine-readable information may include a numeric identifier. The machine-readable information allows the peripheral device, or the processor of the gaming platform, to distinguish one toy from other toys, and the machine-readable information may therefore be considered to include a toy identifier, and in some embodiments, each particular toy has its own distinct identifier. In addition, in many embodiments the machine readable information includes additional information about a corresponding game character, including in some embodiments, status of the game character in a game.

When a toy memory or tag is read by the peripheral device, the peripheral device provides the gaming platform an indication of the identifier and status information of the toy, and generally the processor of the gaming platform commands display of a corresponding game character or otherwise makes the corresponding game character available in game play. Likewise, when a toy in the form of an article such as a hat or weapon is placed on the peripheral device, the processor may make a corresponding article appear in the game and the article may affect changes or the ability to make changes in the game. For example, when a hat toy and a character toy are concurrently on the peripheral device, the corresponding character in the game may possess the corresponding hat. Thus, video game play may be affected by use of real world objects, objects which may also be utilized for play and/or observation separate from video game play. In other embodiments, the toy communicates directly with the gaming device without a peripheral device.

The toy may further include a processor or control circuitry that is in communication with the console directly or indirectly (for example via the peripheral). The processor of the gaming platform may further command the toy to produce effects. For example in one embodiment, the processor on the gaming device may issue a command directing the toy, via the peripheral or directly in various embodiments, to produce light according to game play. For example, when a character associated with the toy is in a low health state, the processor may command the toy to produce a red light to alert the player of the health status. As a further example, when the character's health reaches a predetermined critically low state, the processor may command the toy to produce a flashing red light, for example, by commanding the toy processor or control circuitry to toggle the light on and off. In various embodiments circuitry of the toy may only activate the light if the toy previously or concurrently received a command to enable activation of the light.

Figure 3:
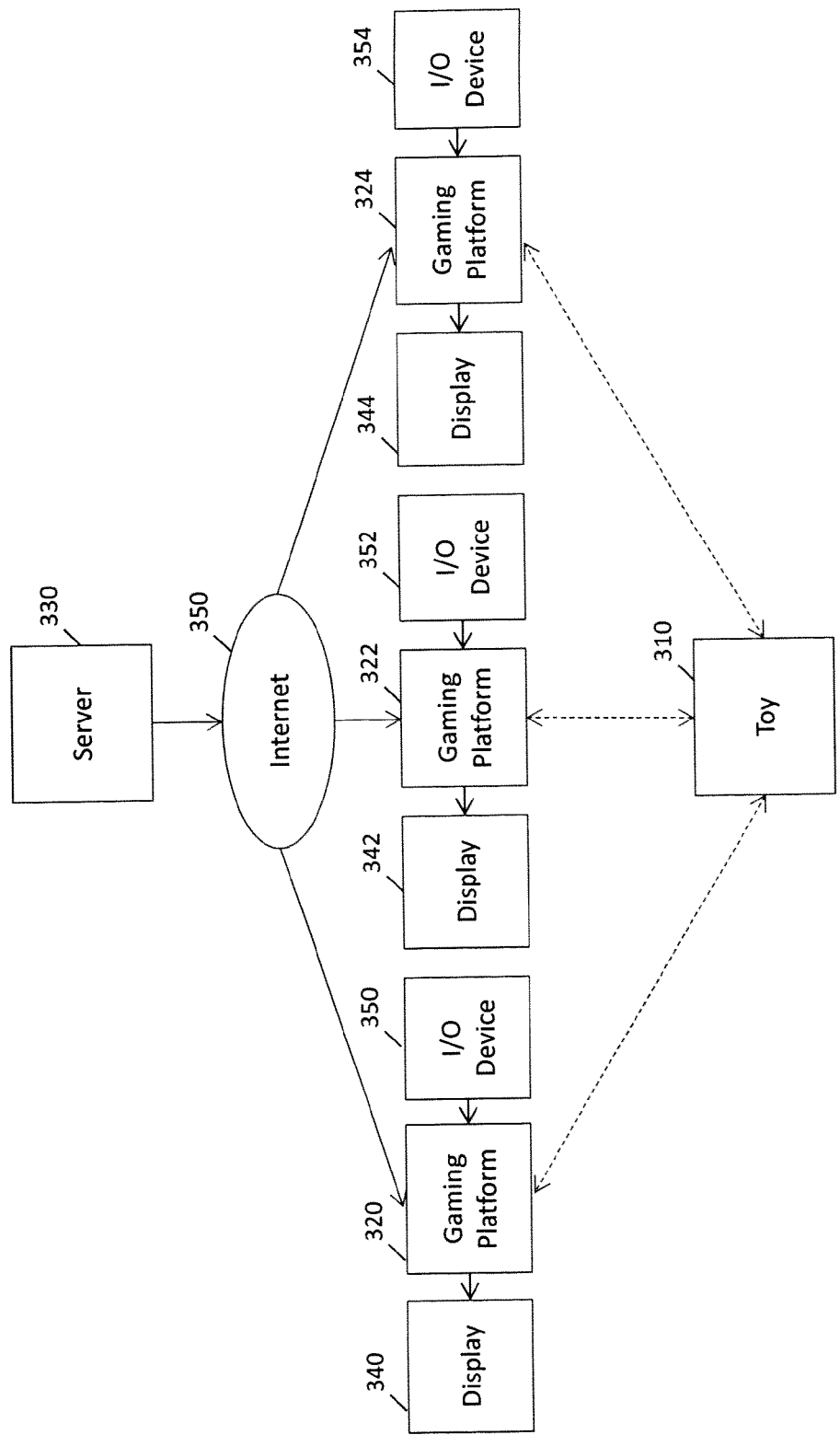
FIG. 3 is a diagram of a game system including a toy in accordance with embodiments of the invention.

FIG. 3 is a block diagram illustrating an example of a video game system in accordance with aspects of the present invention. Referring to FIG. 3, an embodiment of a system in accordance with aspects of the present invention includes gaming platforms 320, 322, 324 with a processor for executing program instructions providing for game play and associated circuitry, I/O devices 350, 352, 354 (such as a video game controller, keyboard, mouse, joystick, touch-screen display, voice input or other known devices), a display devices 340, 342, 344, a toy 310 and a server 330 (or plurality of servers). The gaming platforms 320, 322, 324 may be, in various embodiments, one, some, or any of a variety of processing devices capable of executing a video game program and communicating with a remote server, such as a traditional video game console (e.g. PlayStation, Xbox, Wii, WiiU), portable game console (e.g. Nintendo NDS, PlayStation Portable), a personal computer, a laptop, a mobile computing device (e.g. iPad or other tablet), or other mobile device (e.g. cell phone, iPhone, Blackberry, Droid operated phone, MP3 player). The platforms provide video images to display 340, 342, 344 coupled respectively thereto. The platform may also provide audio outputs either to display 340, 342, 344, or to a separate audio device not depicted in FIG. 3. The display device is generally coupled to the gaming platform by a cable, although in some embodiments a wireless connection may be used. In many embodiments, the display device is a liquid crystal display. In some embodiments, the display device is a television. A display screen 331 of the display device displays video images of game play, generally as commanded by the processor or other associated circuitry of the gaming platform.

The user may control the gaming platforms 320, 322, 324 and game play on the gaming platforms 320, 322, 324 via I/O device 350, 352, 354 coupled respectively thereto. Gaming platform 320 communicates with server 330 via known client/server models and networking techniques, including known internet and cellular communication protocols.

In some embodiments, the gaming platforms 320, 322, 324 are each able to uniquely identify toy 310. The identification of toy 310 may be performed either through a direct coupling between toy 310 and the gaming platforms 320, 322, 324, either through a wired connection (e.g. USB), through a wireless coupling (e.g. Bluetooth or WiFi) or other known object recognition methods, such as recognizing the toy 310 by capturing a visual image of the toy and determining identity, or by scanning a bar code or other code printed on the toy 310. In other embodiments, the gaming platforms 320, 322, 324 are able to identify toy 310 via a peripheral coupled to platforms 320, 322, 324.

In some embodiments, the electronic payload may be enabled in response to identification of the toy 310. For example, based on the toy identification, the toy 310 may produce a flashing red light.

In some embodiments, once a gaming platform (e.g., 320) recognizes and identifies the toy 310, a virtual representation of the toy 310 is presented in a game operating on gaming platform 320. The user may control the virtual representation of the toy 310 within the game. The virtual representation of the toy 310 may have one or more characteristics and/or attributes associated with it, such as health, strength, power, speed, wealth, shield, weapons, or achievement level, for example. As the user plays the game utilizing, at least in part, the virtual representation of the toy 310, the one or more characteristics and/or attributes associated with toy 310 may be altered. For example, as a user progress through different challenges within the game using the virtual representation of toy 310, the user may discover and collect various virtual items, such as a weapon, usable by the virtual representation of toy 310 within the virtual world.

Further, upon the occurrence of a predetermined event or other achievement, the electronic payload may be enabled to produce a visual effect, audible effect, or other human perceptible effect by way of a command from a gaming platform or server. For example, in some embodiments, the electronic payload of the toy may be enabled via the gaming platform when a game character associated with the toy enters a particular area of a virtual world of the video game or achieves a predetermined game play level. In some embodiments, the electronic payload may be enabled via the server 330 in response to registration of the toy, registration of a predetermined number or type of toys, entry of a promotional passcode, or upon the occurrence of other events or game play achievements.

At the completion of a particular a session, or periodically throughout a gaming session, changes in attributes to the virtual representation of toy 310 and electronic payload enablement and accessibility may be stored by gaming platform 320 to server 330. The attribute and/or accessibility data may be stored on said server 330, for example via a relational database, and may be associated with the particular toy 310 for subsequent access by the user utilizing toy 310 in subsequent gaming sessions either on the same or different gaming platforms. Accordingly, the updated data pertaining to the one or more attributes associated with the virtual representation of toy 310 and the payload accessibility of toy 310 may persist across platforms having access to server 330, even if the toy does not include capability to store enablement status, or store enablement status independently of operation with a game console. The attributes and payload accessibility may also be stored elsewhere, such as a memory associated with platform 320 or a memory associated with toy 310.

Figure 4:
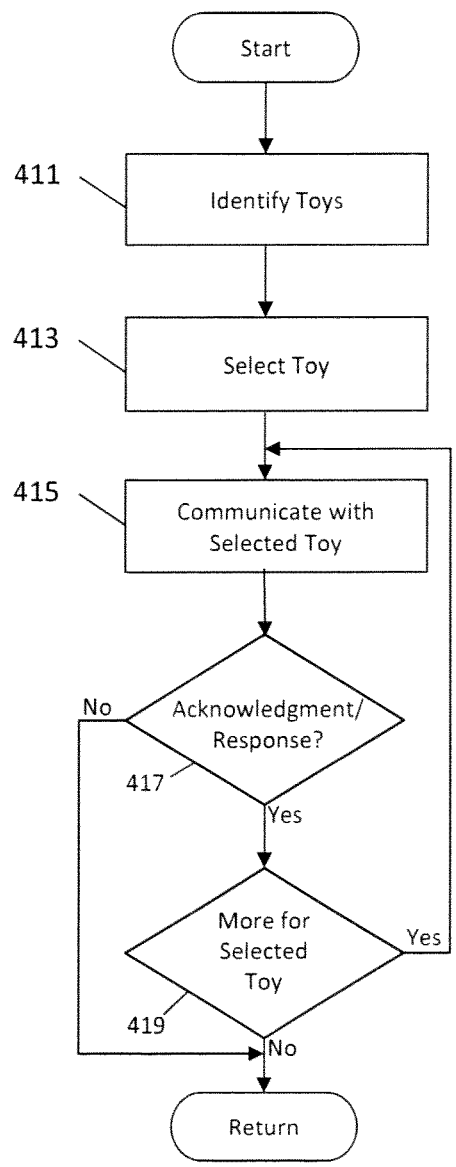
FIG. 4 is a flowchart of a process for communication with toys in accordance with aspects of the invention.

FIG. 4 is a flowchart of a process for communication with toys in accordance with aspects of the invention. The process may be implemented by a video game peripheral, a video gaming platform, or a combination of devices. Additionally, the process may be implemented using a processor configured by program instructions. The process may be performed utilizing a standardized protocol, for example, the ISO/IEC 14443 standard for Identification Cards. Accordingly, the process may communicate with toys via radio-frequency communication.

In block 411, the process identifies toys in a defined region. For example, the process may determine what toys are on the surface of a video game peripheral as shown in FIG. 3. In various embodiments, the toys may be identified by RFID, barcodes, or optical recognition. In one embodiment, identification of toys includes a video game peripheral reading identifiers of the toys and supplying the identifiers to a video gaming platform.

In block 413, the process selects a toy for communication. The process may select the toy by transmitting a selection command having an identifier matching the identifier of the toy. In many embodiments, the process expects to receive an acknowledgment of the selection from the toy. When an acknowledgment is not received, the process may retransmit the selection command or may signal a video game associated with the process that the selected toy is not available.

In block 415, the process communicates with the selected toy. For example, the process may read from a particular memory location of the toy or may write to a particular memory location of the toy, for example a memory location indicative of enablement or disablement of an electrical or electronic payload. Accordingly, the command may include an address value indicating a memory location in the toy to be accessed.

In block 417, the process determines whether it received an acknowledgment from the toy in response to the command sent in block 415. The process may, for example, determine that it received an acknowledgment when it receives a message containing a positive acknowledgment (ACK) from the toy. For a read command, the acknowledgment may include the data read. When the process determines that it has received an acknowledgment, the process continues to block 419; otherwise, the process returns. In other embodiments, the process may return to block 415 to retry sending the command when an acknowledgment has not been received. When the process does not receive an acknowledgment, the process may additionally inform a video game associated with the process that the toy being command to communicate is not present.

In block 419, the process determines whether it has any more commands to send to the toy. The process may determine that it has more commands for the toy, for example, by checking a list of actions in the video game associated with the process. When the process determines that there are more commands for the toy, the process returns to block 415; otherwise, the process returns.

Figure 5:
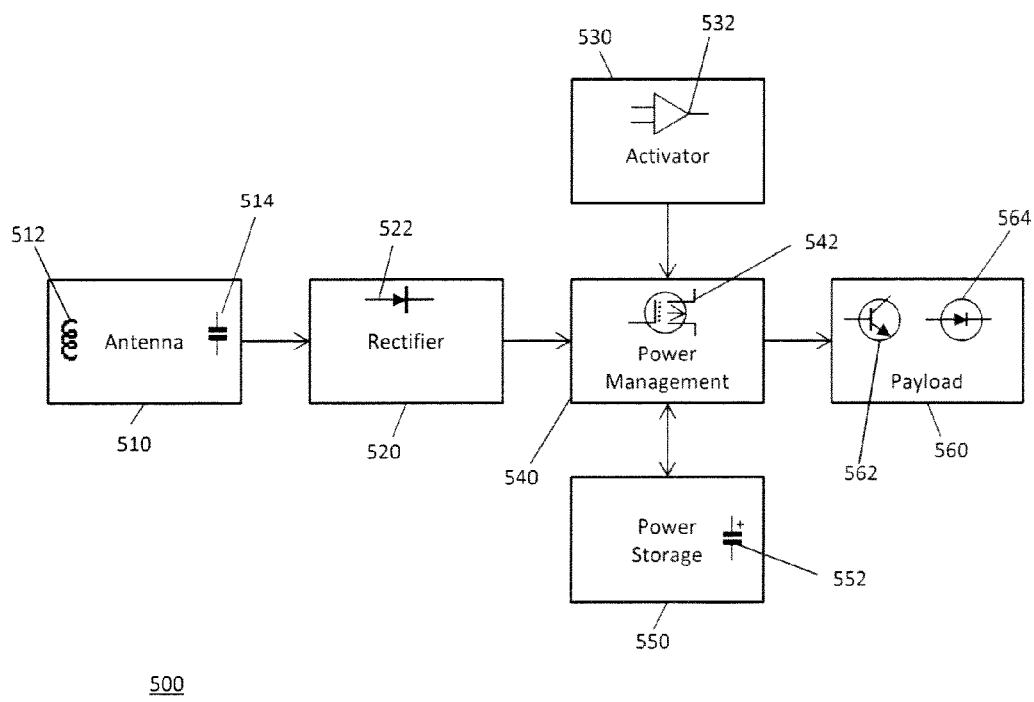
FIG. 5 is a block diagram of an embodiment of circuitry within a toy to provide, in various embodiments, audio, visual, or other physical effects by the toy.

FIG. 5 is a block diagram of an embodiment of circuitry 500 within a toy to provide, in various embodiments, audio, visual, or other physical perceptible effects by the toy. Block 510 provides a proximity detector, such as an ISO 14443 tag. Embodiments of the proximity detector comprise a coil 512, such as an inductor, that is coupled in parallel to a capacitor 514 to form an LC circuit that is coupled to an integrated circuit (IC). In addition to providing for communication between the toy and the peripheral, as described above, the proximity detector 510 in this embodiment is powered by resonant inductive coupling via the LC circuit. Typically, the peripheral produces an electromagnetic field that excites the coil 512 and resonant current charges the capacitor 514, which in turn energizes and powers the IC. In other embodiments, power may be provided to the toy by way of a battery, wired connections, or by other sources.

In the embodiment in FIG. 5, the proximity detector 510 is coupled to a rectifier 520 to convert the alternating current received by the proximity detector 510 to direct current. In one embodiment, the rectifier may comprise a Schottky diode having a low forward voltage and low capacitance. In other embodiments, other known circuitry for converting AC to DC may be used. In still other embodiments, such a circuit may be unnecessary depending on the power source used for the toy.

The output from rectifier 520 is coupled to power management circuit 540, comprising for example a transistor 542, an activator circuit 530, comprising for example an op amp 532 and/or logic circuitry, and a power storage circuit 550, comprising for example a capacitor 552. In this embodiment, the power storage circuit 550 stores the energy and power received from the proximity detector 510. The energy and power stored in the power storage circuit 550 is used to provide energy and power to the payload 560. The power management circuit 540 together with the activator circuit 530 regulate when power is transferred from the power storage circuit 550 to the payload 560. For example, power may be provided to the payload anytime the toy is proximate the peripheral. In other embodiments, the toy may be capable of storing power and generating effects after it is removed from proximity to the peripheral or gaming platform. In other embodiments, power may only be provided to the payload at selected times or intervals, for example, at predetermined intervals or in response to certain events within the video game. In still other embodiments, the activator circuit 530 may include one or more microcontrollers, such as Micro-Chip PIC family, Atmel ATTINY family of microcontrollers.

The payload may comprise any number of electronic circuits or devices. In FIG. 5, an embodiment wherein the payload is comprised of a transistor 562 coupled to a light emitting diode 564 is depicted. Other electronic components that may comprise the payload 560 include a light source, such as a light bulb, laser, LCD, fluorescent light source, or other device emitting light. The light emitted can be of any color and may also be flashing. Other components that may comprise the payload 560 include motors to provide a vibration (such as those used in cellular phones), pulsing, or movement of various toy parts, a speaker or other sound effect device, or a heating, device, or other effects alone or in combination with each other. The payload may be placed anywhere within or throughout the toy interior or exterior.

Figure 6:
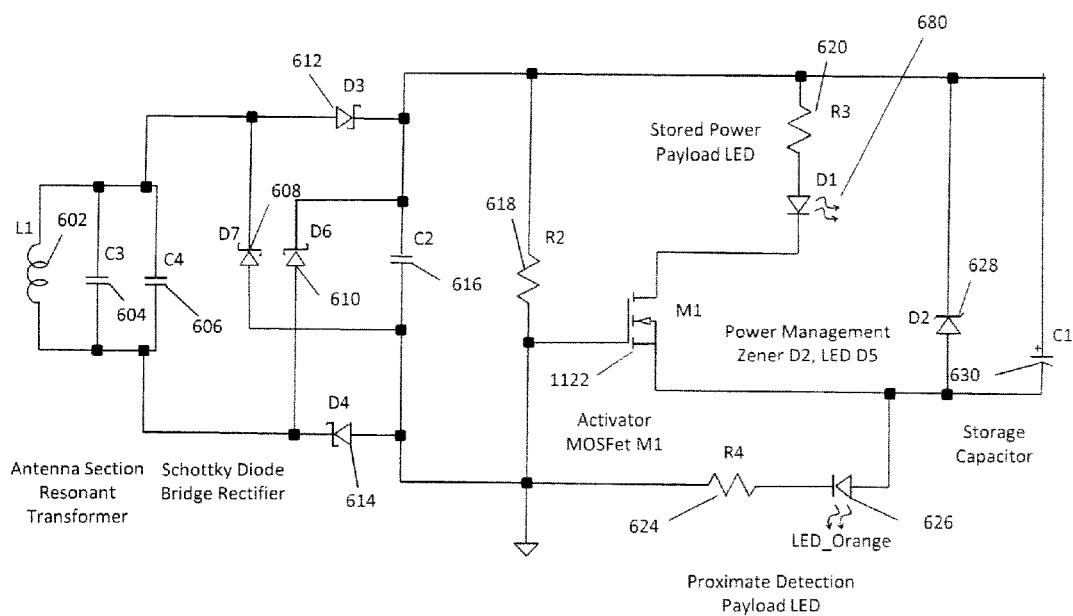
FIG. 6 depicts an embodiment of a circuit within a toy providing lighting effects in connection with a video game in accordance with aspects of this invention.

FIG. 6 depicts an embodiment of a circuit within a to providing lighting effects in connection with a video game in accordance with aspects of this invention. Inductor 602 is connected in parallel with capacitors 604 and 606. In this embodiment, these components in combination correspond in part to the antenna 610 depicted in FIG. 10, and function primarily to receive inductive energy from, for example, the peripheral to the gaming platform (or the gaming platform itself in other embodiments). Schottky diodes 608, 610, 614, 612 in combination with capacitor 616 correspond in part with the rectifier 520 and function primarily to convert the alternating current received from components 602, 604 and 606 to direct current. MOSFET 622 in combination with resistor 618 corresponds in this embodiment with the activator 630. In combination with Zener diode 628, which corresponds in this embodiment with power management 640, and capacitor 630, which corresponds in this embodiment with power storage 550, the flow of current is controlled to the payload, which in this embodiment comprises light emitting diodes 680, 626 and resistors 624, 620.

Figure 7:
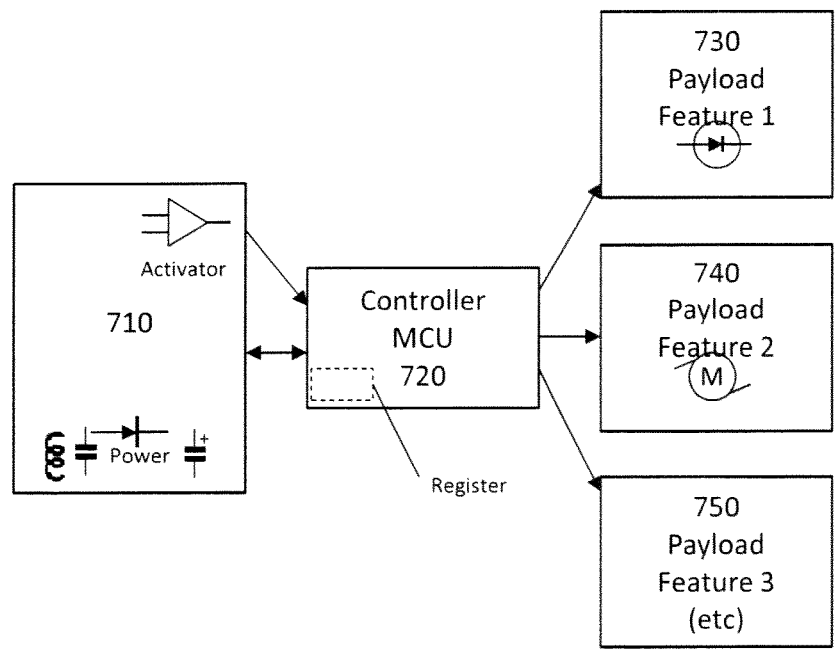
FIG. 7 is a block diagram of an embodiment providing circuitry that may be included within a toy, including control circuitry or a processor to control the disabling enabling of certain effects or functionality of the toy.

In certain embodiments, control circuitry or a processor may be added to the toy to control disable and enable certain effects or functionality of the toy when being used separate from the gaming system, or in some embodiments when used with the gaming system. FIG. 7 is a block diagram of an embodiment providing circuitry that may be included within a toy to provide for control circuitry or a processor to control the disabling or enabling of certain effects or functionality of the toy. Block 710 depicts the circuitry for receiving inductive power from an electromagnetic source as depicted and described in connection with FIG. 5. That circuitry is coupled to a microcontroller 720 which is coupled to various electronic payloads 730, 740, 750 providing effects or functionality in connection with the toy. For example, the various electronic payloads may be an LED, as depicted in block 730, a motor for providing movement, as depicted in block 740, or any other known effects or functionality, as depicted in block 750. The microcontroller 720 activates or deactivates certain payload features 730, 740, 750 based on certain game states. The game states may be determined by microcontroller 720 by processing data with respect to the toy characteristics in game play status received from either a memory on the toy itself, the gaming device (or a peripheral thereto) or a server, or may alternatively receive the game states from a processing device on the gaming device or a remote server.

For example, microcontroller 720 may have an initial setting that disables each of the payload features 730, 740, 750. The initial setting, in various embodiment, may be indicated by a register of the microcontroller (as shown in FIG. 7), or other memory accessible to the microcontroller. When the user uses the toy in connection with a video game, certain game achievements may be accomplished (e.g. completing a level or winning a race) and certain character data associated with the toy may be altered (e.g. obtaining a new weapon or increased health). Depending on these game play events and/or character data changes, the microcontroller 720 may activate or deactivate one or more of the payload features 730, 740, 750. The parameters for determining whether a payload feature is activated may consist of any permutation of variables. For example, a payload feature may be activated or enabled based on a singular achievement (e.g. obtaining a virtual item, completing a level or winning a race), or may depend on a combination of events, achievement or character data. The payload features may be activated in a permanent way or the activation may be temporary. Alternatively, payload features may be deactivated, for example in response to inactivity by the user. The determination of whether a payload feature is to be activated or deactivated may be performed by the microcontroller 720 or a processor on the gaming device or a remote server or combination thereof.

In still further embodiments, the payload feature may be data or software content. In one, the payload feature may be a data file providing for a mobile application when uploaded to a mobile device. The ability to upload the data file for the mobile application is enabled after certain game achievements are reached by the user. In still further embodiments, the payload feature may be data providing access to digital content, such as an access code to enter a website or level or room within the video game or a virtual world, where the access code is not accessible or not enabled until certain game events or achievements are accomplished.

Figure 8:
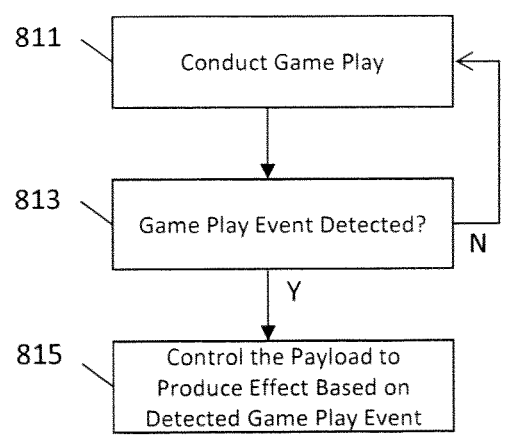
FIG. 8 is a flowchart for activating a payload feature based on the detection of a game play event.

FIG. 8 is a flowchart for activating a payload feature based on the detection of a game play event. In block 801, play of a video game is conducted in connection with a toy having an electronic payload. The video game may be of any type known in the art and may be executed on any type of gaming device. In some embodiments, the process may conduct game play by way of a processor of a video game platform executing instructions to conduct a game play sequence based in part on inputs by a player.

In some embodiments, the process may retrieve information related to a character. In The information may be retrieved by a video game system, or by part of a video game system. The character information may be retrieved from a video game disc, or from information stored in a memory of the physical toy as described above. The character information may include, for example, an elemental association, character level, number of victories, powers possessed by the character and other character attributes.

In block 811, there is a detection of whether a particular game play event has occurred. The game play event may be any occurrence or action within the video game, such as completing a level, defeating an opponent, defeating an enemy, completing a challenge, reaching a certain point level, collecting a certain number or sequence of items, use of a particular character during game play or any other know game play events.

In some embodiments, a video game platform may include a data structure including a plurality of predetermined events and an effect that is to be produced in response to the occurrence of said game play event, with the processor of the video game platform determining if any of the predetermined events has occurred. Game play events may include any occurrences or achievements within the game, for example, obtaining of treasure or other desirable items within the game, solving puzzles, being hit by an enemy, changes to health or supplies, level advancement, high score achievements, defeating of an enemy character, entry to a new location or location type within the virtual, or any other actions, change of conditions, or developments within the game. In one example, a white light is to be produced if a character levels up, but a red light is to be produced if the character is defeated by the enemy. In another example, a blue light is to be produced if the character enters a body of water.

In some embodiments, the game play event is detected based on character information retrieved. That is, the process may command or control a toy to produce an effect, such as light, based on the character information. For example, a toy associated with a character whose data indicates that it has obtained greater strengths may be commanded or controlled to emit a light effect corresponding to the level reached by that character. In further embodiments, functionality or effects of the toy may be activated, enabled or unlocked based on the character information for use when playing with the toy separate from the gaming system.

If the defined game play event is detected to have been reached, in block 821 the electronic payload on the toy is controlled to activate effects on the toy based on the detected game play event. The process initiates, commands or controls the toy to produce an effect, for example a light or sound effect, based on the detected game play event. In some embodiments the process may initiate, command or control the toy by having the processor of the video game platform command illumination of an LED of the toy, with interface circuitry of the video gaming platform providing a signal indicative of the command to the toy. For example, the toy device may be commanded or controlled to illuminate RGB LEDs of the toy, for example in order to produce any one of a plurality of colors by activating or deactivating an LED or a combination of the LEDs.

In further embodiments, a game play event may permanently unlock or enable functionality or an effect of the toy that is enjoyable when playing with the toy outside of the video game system. For example, the toy may include functionality that allows it to generate an audio sound. That functionality could initially be disabled and inaccessible to the user when first playing with the toy. Once certain game events or achievements are reached in the video game, that functionality may be enabled and later accessible to the user to further enhance the enjoyment of the toy and to encourage further game play. For example, in some embodiments, the enabled functionality may be accessible for a limited time period after which the functionality is disabled, and may be re-enabled upon the occurrence of further game events or achievements.

Other functionality or effects beyond audio may be enabled in this manner, such as lighting effects, movement of the toy or parts of the toy, radio control functionality, images displayed on the toy (e.g. a display device incorporated into the toy) or any number of well known toy functions.

The unlocking, of functionality in the toy may be conditioned on any game play event, game play achievement, or use of the toy by the user. For example, the unlocking or enabling of functionality in the toy may be triggered in response to defeating an enemy character in the game or completing a level in the game. In other embodiments, the unlocking or enabling of functionality in the toy may be triggered in response to using the toy on a different platform. For example, a toy functionality may be unlocked if the user uses the toy on a mobile device as opposed to a platform. As another example, a toy functionality may be unlocked if the user uses the toy in connection with a particular service, such as an online gaming service. In some embodiments, the functionality may be unlocked but accessibility may be restricted to use of the toy on a particular platform or may be subject to other restrictions. In other embodiments, the functionality may be accessible on an unlimited basis.

In still further embodiments, that certain functionality has been unlocked on a particular toy may be reflected and stored on the gaming device or a server to allow the video game or virtual environment in which the virtual representation of the toy is used to reflect the unlocked functionality in the game. For example, if a user wins an aspect of the game, such as a race, the user may be rewarded with the toy having lighting effects unlocked (e.g. LED racing stripes on a toy car). A virtual depiction of that unlocked feature may then be reflected in the game either on that same gaming device or another gaming device that is either connected to the server or able to communicate with the toy.

Thereafter, the process returns.

Figure 9:
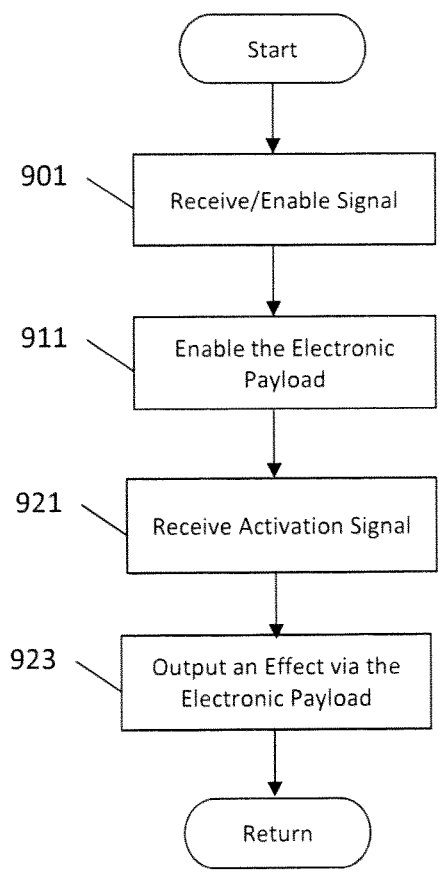
FIG. 9 is a flow diagram illustrating, a process for enabling an electronic payload of a toy in accordance with aspects of the present invention.

FIG. 9 is a flow diagram illustrating a process for enabling an electronic payload of a toy in accordance with aspects of the present invention. Referring to FIG. 9, at block 901, the process receives a signal to enable an electronic payload. The signal may include a command to enable the electronic payload. In some embodiments, the signal may further include a duration value indicating the duration of time for enabling the electronic payload. Other restrictions or limitation may also be included, for example, restrictions based on a type of gaming system on which the toy is used and restrictions on a number of game sessions or game areas in which the electronic payload may be enabled.

At block 911, the process enables the electronic payload to provide an output. The electronic payload may be enabled by writing a bit in a register of the memory of the toy to set an enable flag. In some embodiments, the time duration for enabling the electronic payload may also be written to a location in the memory of the toy.

At block 921 the process receives a signal to activate the payload. In some embodiments the signal to activate the payload may be received with the signal to enable the payload, and in some embodiments the activation signal or the enablement signal may be combined into a single signal. At block 923, the process outputs an effect via the electronic payload. In some embodiments, the effect may comprise, for example, a visual effect, a sound effect, motion or other effect.

Thereafter, the process returns.

Although the invention has been discussed with respect to various embodiments, it should be recognized that the invention comprises the novel and non-obvious claims supported by this disclosure.

What is claimed is:

1. A system, comprising:
   a gaming device for providing a videogame in which a game character interacts with a virtual world, the videogame having predetermined game events; and
   a toy configured to communicate with said gaming device, said toy including an electronic payload providing perceptible effects, circuitry for activating the electronic payload providing perceptible effects, and further including control circuitry for enabling and disabling said electronic payload, said electronic payload comprising at least one light;
   wherein said effects are only enabled when said gaming device communicates to said control circuitry that said predetermined game events within said videogame have occurred, and said electronic payload is only activated upon said gaming device communicating to said circuitry a command to activate said electronic payload;
   wherein the game character is a virtual representation of the toy and the gaming device includes a display for displaying the game character in the virtual world; and
   wherein the gaming device, upon communicating to said circuitry the command to activate said electronic payload, provides on the display a virtual depiction, in the virtual world, of the game character reflecting the perceptible effect.

2. The system of claim 1, wherein said effects are enabled to operate for a limited duration of time, the limited duration of time indicated by a duration value, with the control circuitry disabling said effects after the limited duration of time.

3. The system of claim 1, wherein the toy is configured to communicate with said gaming device by way of radio frequency signals.

4. The system of claim 1, wherein the toy includes memory, and wherein said control circuitry enables and disables said affects by setting a value in memory of the toy.

5. The system of claim 1, wherein said gaming device includes at least a processor configured to execute program instructions to determine game events and to provide for display of video game action.

6. The system of claim 1, wherein the predetermined game events consist of predetermined achievement levels.

\* \* \* \* \*